Figure 3:
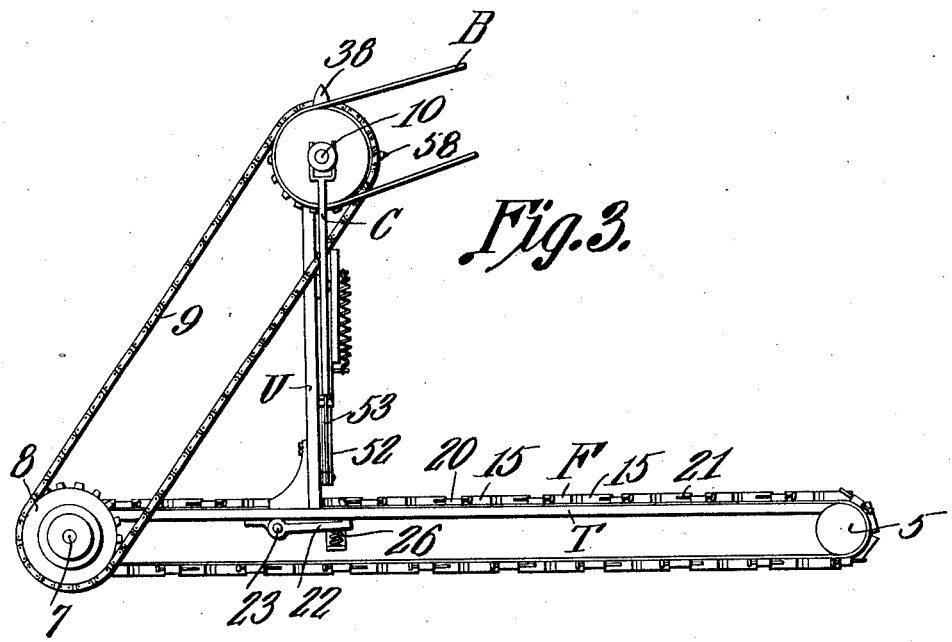

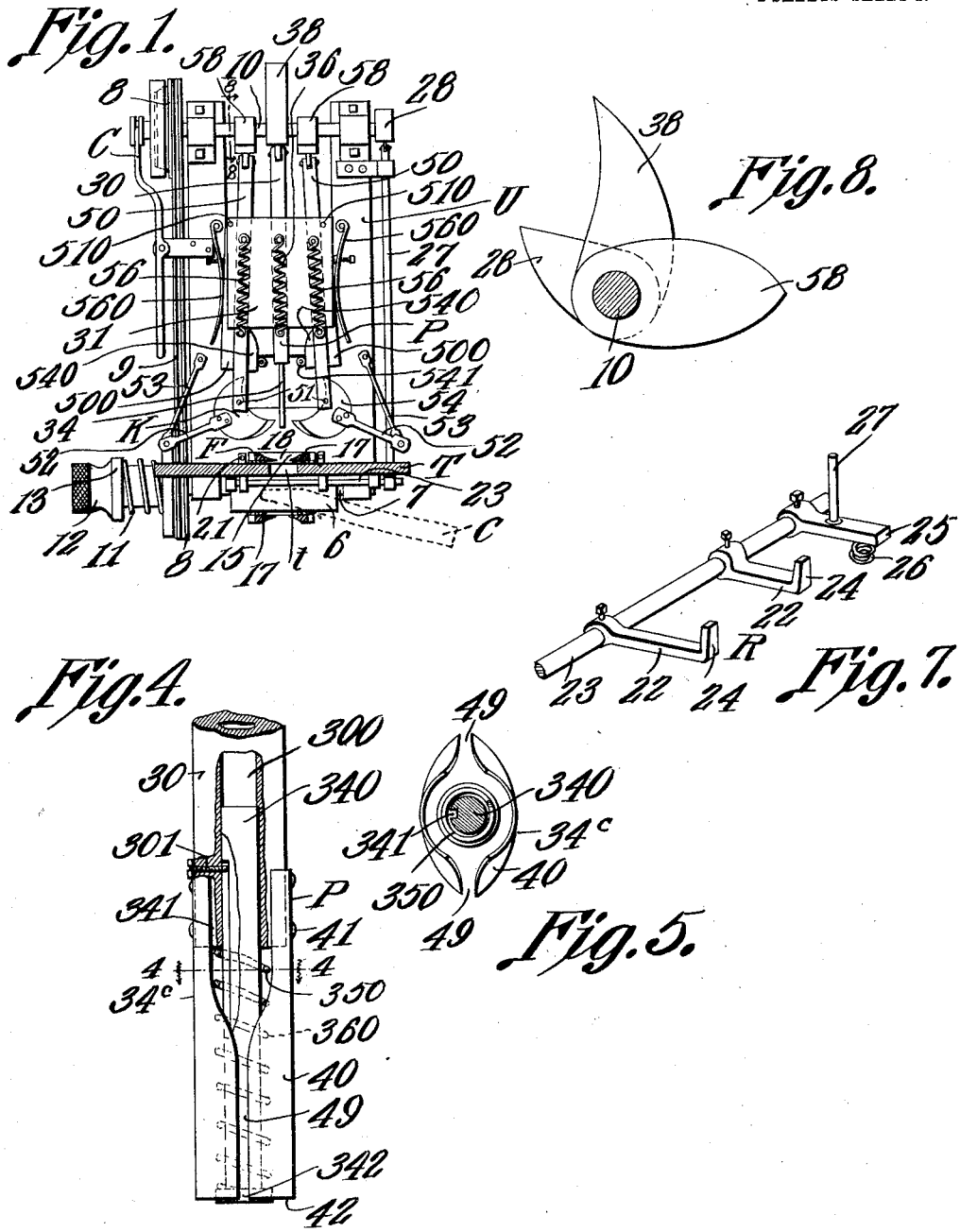

J. P. MARSCH.
FRUIT CUTTER AND PITTER.
APPLICATION FILED FEB. 25, 1911.

1,006,491.

Patented Oct. 24, 1911.
2 SHEETS—SHEET 2.

Witnesses

Jacob P. Marsch, Inventor
by C. A. Snow & Co.
Attorneys

UNITED STATES PATENT OFFICE.

JACOB P. MARSCH, OF MARIETTA, OHIO.

FRUIT CUTTER AND PITTER.

1,006,491.  Specification of Letters Patent.  Patented Oct. 24, 1911.

Application filed February 25, 1911. Serial No. 610,677.

*To all whom it may concern:*

Be it known that I, JACOB P. MARSCH, a citizen of the United States, residing at Marietta, in the county of Washington and State of Ohio, have invented a new and useful Fruit Cutter and Pitter, of which the following is a specification.

This invention relates to the class of vegetable cutters, and more especially to those machines known as pitters; and the object of the same is to produce a machine which will both bisect the most delicate fruit such as a ripe peach, and simultaneously remove its pit or stone, although it will be understood that by slight modifications in the shape of the knives the machine could be made to operate upon other fruit such as plums.

The following description and claims set forth the preferred embodiment of my invention, as illustrated in the drawings wherein—

Figure 2:
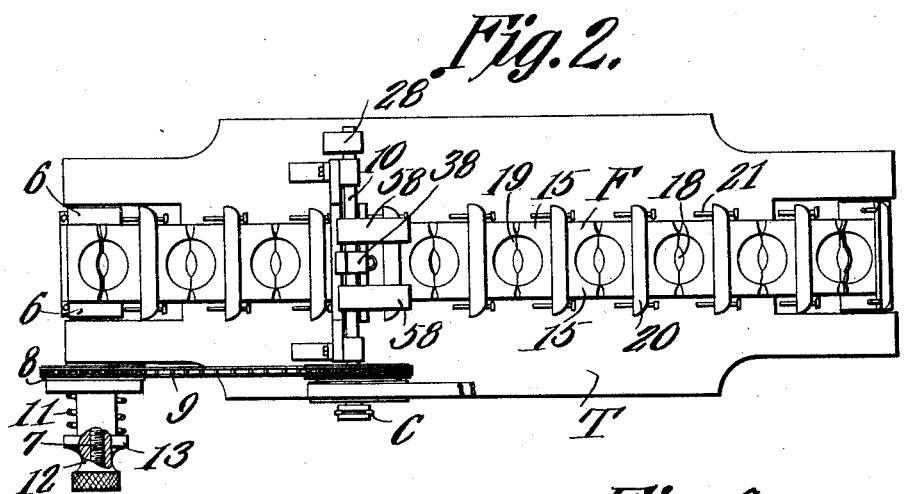
Figure 6:
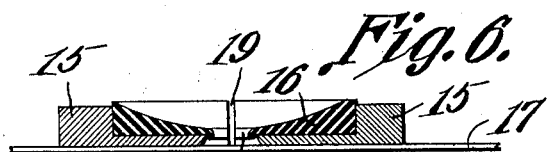

Figure 1 is a front elevation with the table in section. Fig. 2 is a plan view with the tension device in section. Fig. 3 is a side elevation. Fig. 4 is an enlarged detail in elevation and partly in section, of the pitter and its plunger, and Fig. 5 is a cross section on the line 4—4 of Fig. 4. Fig. 6 is an enlarged cross section through the two halves of a fruit pocket. Fig. 7 is a perspective detail of the mechanism for interrupting or retarding the motion of the feed. Fig. 8 is a detail view, showing the cams.

Broadly speaking, this machine comprises an upright framework U and a horizontal table T, the latter carrying the feed mechanism F and the interrupting or retarding mechanism R for checking the motion of the feed, and the upright framework carrying the cutting mechanism or knives K, the pitter and its plunger P, and the hand lever and clutch C for controlling the application of power through a belt B leading to the engine or other suitable source of power (not shown). Much of the detailed construction is omitted because its description and illustration are unnecessary to a complete understanding of the invention.

Over and around the table T moves the feed mechanism F, herein shown as an endless belt which passes over rollers 5 and 6, the latter of which has its shaft 7 continued past one edge of the table so as to carry a driving wheel 8 mounted loosely thereon and belted as at 9 to the cam shaft 10, which latter is driven by power herein illustrated as a belt B controlled by a clutch C, although these details are immaterial. The shaft 7 is connected with its driving wheel 8 by a tension device consisting of a spring 11 surrounding the shaft and bearing against the wheel, and a set screw 12 bearing against a washer 13 which in turn contacts with the outer end of the spring, so that by adjusting the screw the tension may be made, more or less. By this means the speed of the feed mechanism may be varied, as this tension device acts as a spring power transmitting means between the shaft 7 and drive pulley 8, whereby the chain 9 moves at the same speed and operates the feed mechanism at the desired speed.

The feed belt comprises a number of pockets or cups best seen in Fig. 6, each consisting of two like halves or members 15 whose upper faces are slightly dished or cupped and lined with a cushion 16 as of rubber which is so soft that it will not injure the most tender fruit. These members 15 are mounted on parallel belts 17 (see Fig. 1) attached to said members near the outer edges of the latter so as to span a central hole 18 made through each pocket for the pitter and to extend only across the ends of a slit 19 which separates the members 15 on a transverse diametric line through the entire pocket. It is to be understood that the fruit is placed in this pocket as the feed mechanism advances over the table, and for this purpose there must be a sufficient number of pockets exposed on the inlet end of the table to permit the accurate placing of the fruit therein no matter at what speed the machine is driven.

The interrupting or retarding mechanism is best illustrated in Figs. 2 and 7. Across the belts 17 between the pockets are secured cross bars 20, and through the ends thereof are screws 21. The numerals 22 designate fingers mounted on a cross shaft 23 beneath the table T, and their upturned tips 24 extend through openings in the table at proper points to stand astride the belts and be struck by the forward ends of the screws 21. This shaft carries an arm 25 which is spring supported as at 26, and at proper intervals this arm is depressed by a rod 27 whose upper end is struck by a cam 28 on the cam shaft 10. It will be understood that when the finger tips 24 are thus depressed out of the path of the screws 21, the retarding mechanism is idle and the feed progresses; but immediately after one pocket has passed along, the finger tips rise again and the forward progress of the belt is checked as the tension mechanism permits.

For different fruits the pitter will necessitate slight changes in its construction, but the plunger for operating it will be the same under all conditions. The plunger 30 reciprocates vertically in a guide 31 under the impulse of a cam 38 on the shaft 10, and is normally raised by a spring 36, and for a free-stone fruit such as a free-stone peach or plum the pitter 34 is an ordinary rod carried by the lower end of the plunger as seen in Fig. 1. The cam 38 will of course be so timed with respect to the retarding mechanism, that as it causes the descent of the plunger and pitter the latter will drive the stone or pit downward out of the fruit through the hole 18 in the pocket and through a hole $t$ in the table T, whence it is conveyed away by any suitable means such as a chute $c'$ indicated in dotted lines in this view. When the fruit is of the cling-stone variety, the pitter will have to be modified as shown in Figs. 4 and 5. Herein the pitter 340 is mounted in a socket 300 in the lower end of the plunger 30, the latter carrying a pin 301 engaging an upright groove 341 in the pitter to permit the vertical movements thereof and a spring 350 surrounds the pitter between the lower end of the plunger rod and a head 342 at the lower end of the pitter so as to hold the latter normally depressed. In this instance I provide curved knives 40, each of which is secured by screws 41 or otherwise to the lower end of the plunger, and their cutting ends 42 stand about flush with the normally lowermost position of the pitter head 342 as seen in Fig. 4, their adjacent edges being separated by a slit 49 for a purpose to appear hereinafter. If these curved knives are not necessary they may be removed; but ordinarily with a cling-stone peach they must be used or else the descent of the pitter would forcibly tear the stone or pit out of the peach and mutilate the meat thereof. When they are used, it will be clear that in the descent of the pitter the knives cut through the fruit around the stone while the latter causes the rise of the pitter itself, and when the lower end of the slot has engaged the pin 301 (which is after the knives have done their cutting) the pitter follows the knives and forcibly ejects the stone. This falls through the hole in the pocket and through the hole in the table onto the chute in the manner described above.

Concurrently with the act of pitting the fruit the same is bisected by means of the cutting mechanism or knives K whose construction and operating devices are best seen in Fig. 1. Two plungers 50 are mounted in the guide 31, supported by springs 56, and depressed by cams 58 on the cam shaft 10, the parts being so shaped and timed that the fruit shall be cut at the proper moment. Pivoted to the lower end of each plunger at 51 is a crescent shaped blade 54 herein shown as having a curved cutting edge although the same will be dished or shaped to conform with the necessities of the fruit being treated; and projecting outward from the blade is an arm 52 pivotally supported by a link 53 from the upright U. Hence it will be seen that when the plunger 50 is depressed by its cam 58 the blade is caused to rock on its pivot 51 for a purpose which will presently appear. The guide 31 carries a presser 500 pivoted therein at 510 and borne normally inward by a leaf spring 560, and the function of this presser is to press the plunger with its knife or blade normally toward the center of the belt. Secured to the inner side of the plunger 50 is a cam 540 which the presser 500 bears normally against a stop 541 in the upright U, and the shape of this cam is such that it resists the force of the spring 560 when the plunger 50 is elevated, but permits the blade to move inward as the plunger descends and the cam face moves over the stop 541. It follows from this construction that the action of the cam 58 causes the descent of the blade which swings on its pivot 51, and after the blade has passed downward into the cross slit 19 within a pocket (and through the slit 49 between the curved knives 40, if they are used at this time) the cam face 540 by its shape permits the spring 560 to press the blade inward. As both blades 54 have simultaneous movement, their cutting edges therefore approach each other and bisect the fruit, and the dished shape of such cutting edges is of advantage because it permits the blades to cut the meat of the fruit without becoming dulled upon its stone. Even if the latter should be somewhat larger than usual, it will be observed that the blades are pressed inwardly only by the force of the springs 560 and they therefore will not be injured by striking the stone. As above explained, the pitter is properly timed by its cam 38 to act concurrently with the cutting mechanism, and the result is that while the fruit resting in one of the pockets remains for an instant stationary during the interruption of the progress of the belt, it is both bisected and pitted, and immediately after this has occurred the belt resumes its forward movement and the treated fruit is carried along in halves and dropped off the rear end of the belt into a suitable receptacle.

Thus it will be seen that I have produced a machine by which extremely perishable fruit can be treated quickly and in such manner that it is possible to can or preserve it before it decays. In the case of peaches, the skins will be removed by other means not necessary to refer to herein. In the case of fruit having no stone or pit, the crescent shaped pitters will be omitted, or they could remain on the machine and would become idle if the cams 38 were removed or loosened from the cam shaft. With some fruit it would be possible to substitute blades 54 of different shape. As already explained, in the case of cling-stone fruit the curved knives 40 and the modified form of pitter may become necessary. All these details will appeal to the user, and details of construction may be safely left to the manufacturer.

What is claimed is:—

1. In a fruit cutter and pitter, the combination with a feed mechanism including pockets each having a transverse slit and a central upright hole, and spaced belts carrying said pockets; of driving mechanism for said feed mechanism, a tension device in the driving feed mechanism for permitting said mechanism to slip, intermittently operated retarding mechanism for temporarily checking the progress of the feed mechanism, a pitter and cutting blades, and means for actuating the feed mechanism, pitter and cutting blades in timed relation to said retarding mechanism.

2. In a fruit cutter, the combination with a feed mechanism including pockets each having a transverse slit, and spaced belts carrying said pockets; of driving mechanism for said feed mechanism, a tension device in said driving mechanism for permitting said feed mechanism to slip, intermittently operated retarding mechanism for temporarily checking the progress of the feed mechanism, cutting blades, and means for actuating the feed mechanism and cutting blades in timed relation to said retarding mechanism.

3. In a fruit pitter, the combination with a feed mechanism including pockets each having a central hole, and spaced belts carrying said pockets; of driving mechanism for said feed mechanism, a tension device in said driving mechanism for permitting said feed mechanism to slip, intermittently operated retarding mechanism for temporarily checking the progress of the feed mechanism, a pitter, and means for actuating said pitter in timed relation to said retarding mechanism.

4. In a fruit pitter, the combination with a pitter proper, a spring-supported plunger carrying the pitter, and a cam for depressing the plunger; of a feed mechanism including a series of pockets each having a central hole, a table over which the feed mechanism moves and provided with a hole disposed beneath said pitter, cross bars in the feed mechanism between the pockets, screws in the extremities of said bars, driving mechanism for the feed mechanism, a tension device in said driving mechanism to permit said feed mechanism to slip, and retarding mechanism, the same comprising a rock shaft having a spring-supported arm, a cam for depressing said arm at intervals, and fingers on said shaft the tips of said fingers being adapted to stand in the path of said screws or to be depressed out of said path by the depression of said arm.

In testimony that I claim the foregoing as my own, I have hereto affixed my signature in the presence of two witnesses.

JACOB P. MARSCH.

Witnesses:
S. B. DIXON,
FLORENCE E. EVILSIZER.

---

Copies of this patent may be obtained for five cents each, by addressing the "Commissioner of Patents, Washington, D. C."